Apr. 24, 1923.

I. W. BROGGER 1,452,590

ELECTRICAL MEASURING INSTRUMENT

Filed April 26, 1919     2 Sheets-Sheet 1

INVENTOR:
Ivar W. Brogger,
BY
Russell M. Everett,
ATTORNEY.

Apr. 24, 1923.  
I. W. BROGGER  
1,452,590

ELECTRICAL MEASURING INSTRUMENT

Filed April 26, 1919  2 Sheets-Sheet 2

INVENTOR:
Ivar W. Brogger,
BY
Russell M. Everett,
ATTORNEY.

Patented Apr. 24, 1923.

1,452,590

UNITED STATES PATENT OFFICE.

IVAR W. BROGGER, OF NEWARK, NEW JERSEY, ASSIGNOR TO STANDARD ELECTRIC MANUFACTURING COMPANY, A CORPORATION OF NEW JERSEY.

ELECTRICAL MEASURING INSTRUMENT.

Application filed April 26, 1919. Serial No. 292,994.

*To all whom it may concern:*

Be it known that I, IVAR W. BROGGER, a subject of the Kingdom of Norway, residing at Newark, in the county of Essex and State of New Jersey, have invented new and useful Improvements in Electrical Measuring Instruments, of which the following is a specification.

The objects of the invention are to employ in an electrical measuring instrument a permanent magnet for the moving member; to thus secure a positive action and obtain an inexpensive construction which shall be reliable and accurate; to provide improved means for positioning or holding the permanent magnet of the moving member; to secure an improved adjustment of the core of a field solenoid or electromagnet with respect to the moving member; to provide for further relative adjustment between the moving member and lines of force of the field so as to regulate the instrument and ensure its accuracy; to secure improved means for damping the movements of the movable member; to combine said damping means and means for holding the permanent magnet of the moving member; to combine said damping means and means for adjusting the core of the solenoid or electromagnet; to combine said damping means and means for further adjusting the lines of force of the field relative to the moving member; and to obtain other advantages and results as may be brought out in the following description.

Referring to the accompanying drawings, in which like numerals of reference indicate the same parts throughout the several views, Figure 1 is a plan of an instrument of my improved construction with the casing removed;

Figure 1:
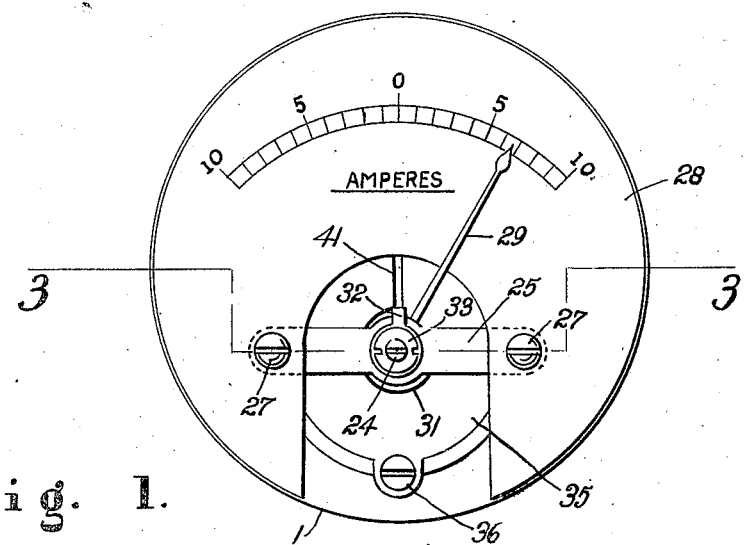

In said drawings, 1 indicates a suitable base plate for my improved instrument mounted upon posts 2, 2, which are shown extending through holes in the base plate and receiving nuts 3, 3, which clamp the base plate against flanges 4, 4 on said posts. The other ends of these posts may extend through the board 5 upon which the instrument is to be mounted and receive on the opposite side thereof nuts 6, 6. I have shown the current entering and leaving the instrument through these posts 2, 2 by means of wires 7, 8 secured by binding nuts 9, 9, and therefore the posts 2, 2 are insulated from the base plate 1 by means of washers 10, 11 and a bushing 12 between metal washers 13, 14 next the nut 3 and flange 4 of each post. It will be understood that any suitable form of base plate and mounting means therefor can be employed, and that which I have shown is for purposes of illustration only.

Upon the base plate 1 is mounted a damping box 15 secured thereto by screws 16, 16 and providing a preferably cylindrical chamber in which the moving member is pivotally mounted upon a staff lying in the axial line of said chamber, as will be hereinafter more fully described. While I prefer to employ the damping box 15 for mounting the moving member, it will be understood that it could be dispensed with and the moving member mounted in its position by any other suitable means, if desired.

The said damping box 15 is preferably made of non-magnetic material and provides at its outer side means for holding the core of a solenoid or electromagnet in a plane through the axis of the moving member substantially perpendicular to the zero position of said moving member. I have shown this done by providing the box 15 with an outer rib 17, see Figure 2, into which the core 18 screws, a lock nut 19 being provided to hold the core in adjusted position. It will be understood that a conductor 20 extending from one of the posts 2 to the other is coiled into a solenoid 21 surrounding the core 18, and the current passing through this solenoid produces lines of force in the field which exert a corresponding influence upon the moving member and thus enable the current to be measured. By the use of an adjustable core, the effect of the lines of force upon the moving coil can be increased or diminished and the movement of the moving member correspondingly varied.

The pivot staff 22 of the moving member is mounted at its lower end in a bearing 23 in the bottom of the damping box and at its upper end in a bearing screw 24 working in a bridge 25 extending over the damping box and spaced therefrom by sleeves 26, 26 upon screws 27, 27. The dial plate 28 is preferably carried on said bridge and held by the heads of said screws 27, 27, being cut away over the damping box 15 to clear the pivot staff, its upper mounting and the parts carried by it, including the pointer 29, which is preferably fast on the pivot staff at the top of the damping box and bends upward as at 30 to overlie the dial plate 28. A coiled spring 31 surrounds the upper end of the pivot staff, adjacent its jewel screw 24, and is attached thereto at its inner end, its outer end being attached to a spring holder 32 clamped upon the bridge 25 by a lock nut 33 on the bearing screw, said spring serving to hold the pointer 29 in zero position as is common in instruments of this type.

Upon the pivot staff 22 and within the chamber of the damping box is mounted a damping vane 34 which extends substantially across the damping chamber and from top to bottom thereof, clearing the side walls, top and bottom, only enough to allow it to swing with the necessary freedom as the pivot staff turns. Preferably the top of the damping chamber is closed by a cover 35 held in place by a screw 36. This damping vane 34 I have shown made of sheet metal with a couple of loops 34ª pressed out of itself to enable the pivot staff to pass through and be cemented or otherwise held against independent turning. Also longitudinally of itself and therefore at right angles to the pivot staff said damping vane has a groove 34ᵇ which preferably terminates short of the ends of the vane and in which groove is cemented a bar magnet 37 of the permanent type. Preferably this bar magnet 37 is arranged on the opposite side of the pivot staff from the pointer 29, as is also the damping vane 34, so as to balance said pointer and a further balancing effect is secured by an extension 38 at the upper edge of the damping vane opposite the pointer 29. I have also shown the edges of the damping vane bent at right angles to form a flange 39, in order to increase the damping effect by offering greater resistance to the air enclosed in the damping box passing the vane, although it is not essential to flange said edges.

It will be understood that the bar magnet could be mounted on the pivot staff by any other suitable means in case no damping vane were employed, but I prefer to use the damping vane and have therefore shown the combined construction. To secure the damping action, a rib 40 extends inwardly from the wall of the damping chamber, opposite the outer rib 17 and nearly to the pivot staff 22 and parts carried thereby, as clearly shown in Figures 2 and 4, and thus as the moving member swings one end or the other of the damping vane tends to compress the air in the damping chamber between itself and said rib, ensuring movement of the pointer or indicator to its deflected positions without undue oscillation at such positions. Preferably the cover 35 of the damping chamber is slotted, as at 41, to receive the pivot staff 22, and this slot lies upon the top of the rib 40 and is closed thereby when the cover is in place.

Figure 2:
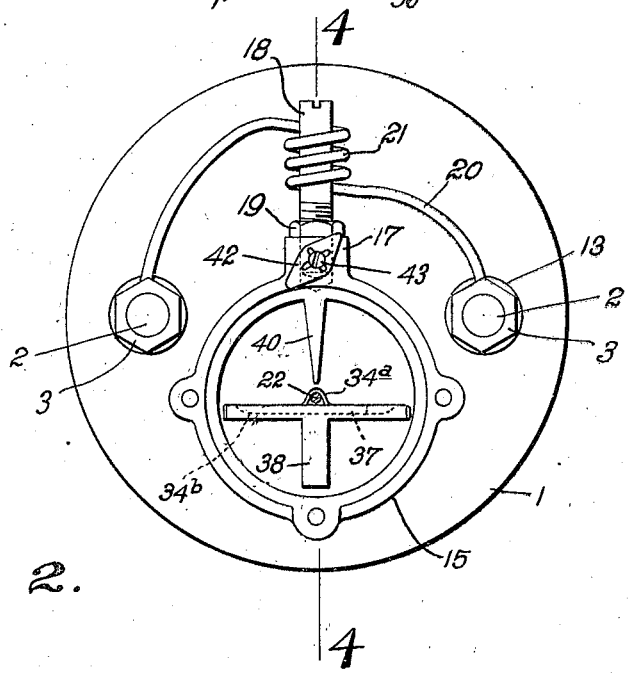
Figure 2 is a section on lines 2—2, Fig. 3.
Figure 3:
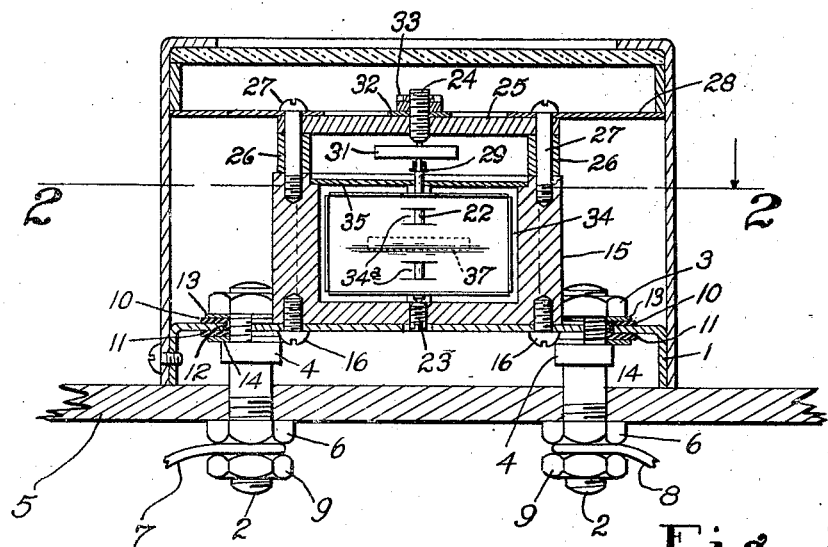
Figure 3 is a section perpendicular to the planes of Figs. 1 and 2, on line 3—3, Fig. 1.
Figure 4:
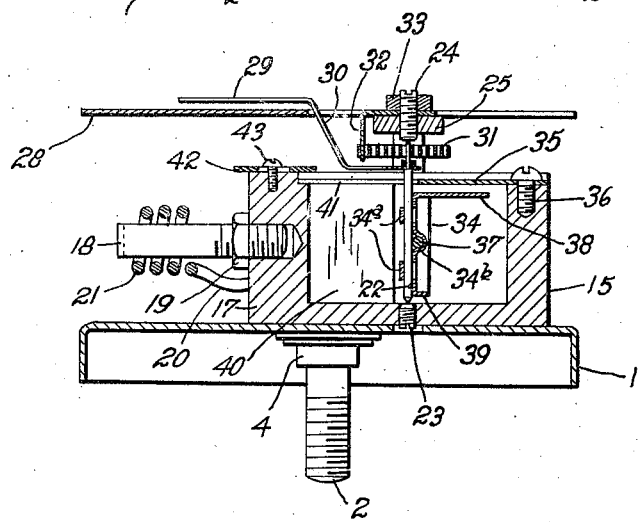
Figure 4 is a section one line 4—4, Fig. 2.
Figure 5:
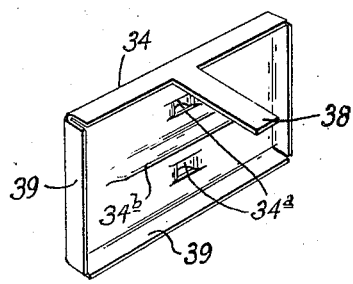
Figure 5 is a detail perspective view of the damping vane.
Figure 6:
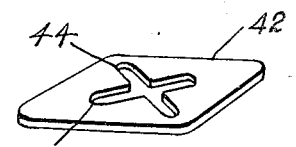
Figure 6 is a detail view of an adjustable pole piece.

For further adjusting the field lines of force with reference to the moving member, I prefer to mount upon the top of the rib 17 a pole piece 42, see Figures 2, 4 and 6, which is elongated and mounted by a screw 43 extending loosely through the pole piece so that by loosening said screw the pole piece can be shifted toward and away from the moving member or laterally of the line of the solenoid 21. In this way the direction of the lines of force can be changed to compensate for inaccurate mounting of the bar magnet 37 on the damping vane and cause the moving member to swing equally in both directions. Said pole piece is of course of magnetic material and preferably it has longitudinal and transverse slots 44, 45, as shown in Figure 6, to facilitate its shifting in addition to turning pivotally. By means of this pole piece, as well as adjustable core 18, very accurate adjustment of the instrument can be quickly and easily made, and by having the moving member a permanent magnet an inexpensive construction is secured. My improved damping box and vane, also, not only facilitate damping, but lend themselves very nicely to combination with the other features of my construction.

Obviously detail modifications and changes may be made in manufacturing my improved instrument without departing from the spirit and scope of the invention and I do not wish to be understood as restricting myself except as required by the following claims when construed in the light of the prior art.

Having thus described the invention, what I claim is:

1. In a current measuring instrument, a solenoid through which the current to be measured passes, a core for said solenoid, a moving member in the field of said solenoid, and a flux directing member for said core adjustable laterally with respect thereto.

2. In a current measuring instrument, a solenoid through which the current to be measured passes, a longitudinally adjustable core for said solenoid, a moving member in the field of said solenoid, and a flux directing member for said core adjustable laterally with respect to the line of longitudinal adjustment of the core.

3. In a current measuring instrument, a solenoid through which the current to be measured passes, a core for said solenoid, a moving member in the field of said solenoid, a core support, a flux directing member on said support having an adjusting slot, and means extending through said slot for positioning the flux directing member on said support.

4. In a current measuring instrument, a solenoid through which the current to be measured passes, a core for said solenoid, a moving member in the field of said solenoid, and an adjustable flux directing member for said core.

5. In a measuring instrument, a solenoid through which the current to be measured passes, a moving member in the field of said solenoid, and a flux directing member for said solenoid adjustable longitudinally of the solenoid toward and away from the moving member and laterally from the line of such longitudinal adjustment.

6. In a measuring instrument, a solenoid through which the current to be measured passes, a moving member in the field of said solenoid, a flux directing member for said solenoid having intersecting slots in itself, a support for said flux directing member, and means extending through said slots for clamping the flux directing member in position on said support.

7. In a current measuring instrument, a solenoid through which the current to be measured passes, a moving member in the field of said solenoid, a threaded core support, a core for said solenoid in said threaded support and correspondingly threaded so as to be adjusted therein by turning, and an adjustable flux directing member for said core and solenoid.

8. In a current measuring instrument, a solenoid through which the current to be measured passes, a moving member in the field of said solenoid, a threaded core support, a core for said solenoid in said threaded support and correspondingly threaded so as to be adjusted therein by turning, and a flux directing member for said core and solenoid mounted on said support so as to be adjustable with respect to the moving member toward and away from the same longitudinally of the solenoid and also transversely of such a line.

9. In a current measuring instrument, a solenoid through which the current to be measured passes, a moving member in the field of said solenoid, a threaded core support, a core for said solenoid in said threaded support and correspondingly threaded so as to be adjusted therein by turning, a flux directing member having intersecting longitudinal and transverse slots, and means extending through said slots into the core support for clamping the flux directing member thereto.

10. In a measuring instrument, a damping box, a pivot staff extending through said damping box, a damping vane on said pivot staff in the damping chamber, a moving member also in the damping box and carried by said pivot staff, and a field member outside the damping box.

11. In a measuring instrument, a damping box, a pivot staff in said damping box, a damping vane on said pivot staff, a moving member secured to the damping vane, both said damping vane and moving member being within the damping box, and a field member outside the damping box.

12. In a measuring instrument, a damping box, a pivot staff in said damping box, a damping vane on said pivot staff having a groove formed therein, a moving member secured in said groove, and a field member outside the damping box.

13. In a measuring instrument, a damping box, a pivot staff in said damping box, a damping vane secured to one side of said pivot staff and having a groove in its side next said pivot staff, a moving member in said groove between the damping vane and pivot staff, and a field member outside the damping box.

14. In a measuring instrument, a damping box, a pivot staff mounted in said damping box, a rib extending from the wall of said damping box nearly to said pivot staff projecting at both sides thereof, a damping vane on said pivot staff, a moving member carried by said damping vane at the opposite side of the pivot staff from said rib, and a field member outside the damping box adjacent said rib.

15. In a measuring instrument, a damping box having an exterior threaded seat, a pivot staff mounted in said damping box, a damping vane on said pivot staff, a moving member also carried by the pivot staff, a field coil outside the damping box, and a core for said coil adjustably threaded into said seat on the exterior of the damping box.

16. In a measuring instrument, a damping box having an exterior threaded seat, a pivot staff mounted in said damping box, a damping vane on said pivot staff, a moving member also carried by the pivot staff, a field coil outside the damping box, a core for said coil adjustably threaded into said seat on the exterior of the damping box, and an adjustable flux directing member on the wall of the damping box above said seat.

17. In a measuring instrument, a damping box having an exterior threaded seat, a pivot staff mounted in said damping box, a damping vane on said pivot staff, a moving member also carried by the pivot staff, a field coil outside the damping box, a core for said coil adjustably threaded into said seat on the exterior of the damping box, and a flux directing member at the top of the wall of the damping box above the end of the core which is seated in said wall, said flux directing member being adjustable toward and away from the moving member and also transversely of such a line of adjustment.

IVAR W. BROGGER.